United States Patent
Onozawa

(10) Patent No.: US 7,643,082 B2
(45) Date of Patent: Jan. 5, 2010

(54) IMAGING APPARATUS HAVING AN AUTOFOCUS FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 512 days.

(21) Appl. No.: 11/342,378

(22) Filed: Jan. 27, 2006

(65) Prior Publication Data

US 2006/0181634 A1 Aug. 17, 2006

(30) Foreign Application Priority Data

Feb. 16, 2005 (JP) .............................. 2005-038589

(51) Int. Cl.
H04N 5/232 (2006.01)
G03B 13/00 (2006.01)
(52) U.S. Cl. .......................... 348/347; 348/353; 396/81
(58) Field of Classification Search ............ 348/333.02, 348/345–357; 396/81
See application file for complete search history.

(56) References Cited

U.S. PATENT DOCUMENTS

| | | | | |
|---|---|---|---|---|
| 5,392,089 | A * | 2/1995 | Fox | 396/82 |
| 5,506,654 | A * | 4/1996 | Kim | 396/147 |
| 5,597,999 | A * | 1/1997 | Kinba et al. | 250/201.7 |
| 6,704,054 | B1 * | 3/2004 | Hashimoto | 348/354 |
| 6,714,731 | B2 * | 3/2004 | Ogg et al. | 396/81 |
| 2002/0041334 | A1 * | 4/2002 | Okawara | 348/335 |
| 2002/0149689 | A1 * | 10/2002 | Sannoh et al. | 348/333.02 |
| 2003/0063322 | A1 * | 4/2003 | Itoh et al. | 358/302 |
| 2003/0071911 | A1 * | 4/2003 | Shinohara et al. | 348/370 |
| 2003/0174231 | A1 * | 9/2003 | Yahagi et al. | 348/345 |
| 2004/0080662 | A1 * | 4/2004 | Ogino | 348/345 |
| 2005/0012846 | A1 * | 1/2005 | Shinohara | 348/345 |
| 2005/0018071 | A1 * | 1/2005 | Yasuda | 348/345 |
| 2005/0104992 | A1 * | 5/2005 | Aoyama et al. | 348/345 |
| 2005/0185084 | A1 * | 8/2005 | Nonaka et al. | 348/345 |

FOREIGN PATENT DOCUMENTS

JP 2003-140027 A 5/2003

* cited by examiner

*Primary Examiner*—Lin Ye
*Assistant Examiner*—Dennis Hogue
(74) *Attorney, Agent, or Firm*—Frishauf, Holtz, Goodman & Chick, P.C.

(57) ABSTRACT

A scan representation position table to which three points of focus positions which become scan representation positions are recorded respectively is stored in advance based on the lens position of the zoom lens 2b and the type of priority focus.

The current zoom lens 2b lens position is acquired and determination processing for short-distance priority focus or long-distance priority focus is performed when judged that the shutter button has been fully depressed at once or when the shutter button has been fully depressed before the passage of a predetermined time duration after the shutter button was halfway depressed. Then, the focus positions are acquired from the scan representation position table based on the acquired lens position and the judged priority focus, and the contrast AF processing is executed within the range of the acquired three points of focus positions.

14 Claims, 9 Drawing Sheets

| ZOOM LENS POSITION / FOCUS TYPE | ZOOM 1 | ZOOM 2 | ZOOM 3 | ZOOM 4 | ZOOM 5 | ZOOM 6 | ZOOM 7 |
|---|---|---|---|---|---|---|---|
| SHORT-DISTANCE PRIORITY FOCUS | FOCUS POSITION FOR DEPTHS 0.7m~1.5m, 1.0m~4.0m, 3.0m~10.0m | FOCUS POSITION FOR DEPTHS 0.9m~2.0m, 1.2m~4.3m, 1.5m~8.2m | FOCUS POSITION FOR DEPTHS 1.1m~2.2m, 1.5m~4.6m, 1.9m~9.8m | FOCUS POSITION FOR DEPTHS 1.3m~2.3m, 2.0m~5.0m, 2.5m~10.0m | FOCUS POSITION FOR DEPTHS 1.6m~2.8m, 2.3m~5.0m, 3.0m~10.0m | FOCUS POSITION FOR DEPTHS 1.8m~2.9m, 2.6m~5.2m, 3.6m~10.0m | FOCUS POSITION FOR DEPTHS 2.0m~3.0m, 2.8m~5.0m, 4.0m~10.0m |
| LONG-DISTANCE PRIORITY FOCUS (OPEN APERTURE) | FOCUS POSITION FOR DEPTHS 0.8m~2.0m, 1.2m~5.6m, 1.6m~∞m | FOCUS POSITION FOR DEPTHS 0.9m~2.0m, 1.4m~5.6m, 1.8m~∞m | FOCUS POSITION FOR DEPTHS 1.2m~2.2m, 1.6m~4.6m, 2.5m~∞m | FOCUS POSITION FOR DEPTHS 1.3m~2.3m, 2.0m~5.0m, 3.3m~∞m | FOCUS POSITION FOR DEPTHS 1.6m~2.8m, 2.3m~5.0m, 4.2m~∞m | FOCUS POSITION FOR DEPTHS 2.0m~3.3m, 2.9m~6.4m, 5.2m~∞m | FOCUS POSITION FOR DEPTHS 2.4m~3.9m, 3.4m~7.3m, 6.3m~∞m |
| LONG-DISTANCE PRIORITY FOCUS (UNOPEN APERTURE) | FOCUS POSITION FOR DEPTHS 0.5m~1.3m, 0.7m~3.8m, 0.9m~∞m | FOCUS POSITION FOR DEPTHS 0.6m~1.3m, 0.8m~2.8m, 1.1m~∞m | FOCUS POSITION FOR DEPTHS 0.7m~1.4m, 1.0m~3.0m, 1.5m~∞m | FOCUS POSITION FOR DEPTHS 0.8m~1.3m, 1.1m~2.6m, 2.0m~∞m | FOCUS POSITION FOR DEPTHS 1.0m~1.6m, 1.5m~3.2m, 2.5m~∞m | FOCUS POSITION FOR DEPTHS 1.2m~2.0m, 1.8m~4.0m, 3.2m~∞m | FOCUS POSITION FOR DEPTHS 1.5m~2.3m, 2.2m~4.6m, 3.9m~∞m |

| IMAGING MEANS |
| --- |
| CONTRAST AF MEANS |
| PHASE DIFFERENCE AF MEANS |
| JUDGMENT MEANS |
| DETERMINATION MEANS |
| FIRST AF CONTROL MEANS |
| SECOND AF CONTROL MEANS |
| THIRD AF CONTROL MEANS |
| FOURTH AF CONTROL MEANS |
| OPTICAL ZOOM MAGNIFICATION SETTING MEANS |
| OPTICAL ZOOM MEANS |
| ZOOM LENS POSITION ACQUISITION MEANS |
| FOCUS POSITION ACQUISITION MEANS |
| PF POSITION ACQUISITION MEANS |
| RANGE ACQUISITION MEANS |
| DISTANCE ACQUISITION MEANS |
| FIRST FAILURE JUDGMENT MEANS |
| SECOND FAILURE JUDGMENT MEANS |
| FIRST JUDGMENT MEANS |
| SECOND JUDGMENT MEANS |
| THIRD JUDGMENT MEANS |
| COMPLETION JUDGMENT MEANS |

FIG. 2

| ZOOM LENS POSITION / FOCUS TYPE | ZOOM 1 | ZOOM 2 | ZOOM 3 | ZOOM 4 | ZOOM 5 | ZOOM 6 | ZOOM 7 |
|---|---|---|---|---|---|---|---|
| SHORT-DISTANCE PRIORITY FOCUS | FOCUS POSITION FOR DEPTHS 0.7m~1.5m, 1.0m~4.0m, 3.0m~10.0m | FOCUS POSITION FOR DEPTHS 0.9m~2.0m, 1.2m~4.3m, 1.5m~8.2m | FOCUS POSITION FOR DEPTHS 1.1m~2.2m, 1.5m~4.6m, 1.9m~9.8m | FOCUS POSITION FOR DEPTHS 1.3m~2.3m, 2.0m~5.0m, 2.5m~10.0m | FOCUS POSITION FOR DEPTHS 1.6m~2.8m, 2.3m~5.0m, 3.0m~10.0m | FOCUS POSITION FOR DEPTHS 1.8m~2.9m, 2.6m~5.2m, 3.6m~10.0m | FOCUS POSITION FOR DEPTHS 2.0m~3.0m, 2.8m~5.0m, 4.0m~10.0m |
| LONG-DISTANCE PRIORITY FOCUS (OPEN APERTURE) | FOCUS POSITION FOR DEPTHS 0.8m~2.0m, 1.2m~5.6m, 1.6m~∞m | FOCUS POSITION FOR DEPTHS 0.9m~2.0m, 1.4m~5.6m, 1.8m~∞m | FOCUS POSITION FOR DEPTHS 1.2m~2.2m, 1.6m~4.6m, 2.5m~∞m | FOCUS POSITION FOR DEPTHS 1.3m~2.3m, 2.0m~5.0m, 3.3m~∞m | FOCUS POSITION FOR DEPTHS 1.6m~2.8m, 2.3m~5.0m, 4.2m~∞m | FOCUS POSITION FOR DEPTHS 2.0m~3.3m, 2.9m~6.4m, 5.2m~∞m | FOCUS POSITION FOR DEPTHS 2.4m~3.9m, 3.4m~7.3m, 6.3m~∞m |
| LONG-DISTANCE PRIORITY FOCUS (UNOPEN APERTURE) | FOCUS POSITION FOR DEPTHS 0.5m~1.3m, 0.7m~3.8m, 0.9m~∞m | FOCUS POSITION FOR DEPTHS 0.6m~1.3m, 0.8m~2.8m, 1.1m~∞m | FOCUS POSITION FOR DEPTHS 0.7m~1.4m, 1.0m~3.0m, 1.5m~∞m | FOCUS POSITION FOR DEPTHS 0.8m~1.3m, 1.1m~2.6m, 2.0m~∞m | FOCUS POSITION FOR DEPTHS 1.0m~1.6m, 1.5m~3.2m, 2.5m~∞m | FOCUS POSITION FOR DEPTHS 1.2m~2.0m, 1.8m~4.0m, 3.2m~∞m | FOCUS POSITION FOR DEPTHS 1.5m~2.3m, 2.2m~4.6m, 3.9m~∞m |

FIG. 3

| ZOOM LENS POSITION  FOCUS TYPE | ZOOM 1 | ZOOM 2 | ZOOM 3 | ZOOM 4 | ZOOM 5 | ZOOM 6 | ZOOM 7 |
|---|---|---|---|---|---|---|---|
| SHORT-DISTANCE PRIORITY FOCUS | FOCUS POSITION FOR DEPTHS 1.0m~4.9m | FOCUS POSITION FOR DEPTHS 1.2m~5.0m | FOCUS POSITION FOR DEPTHS 1.5m~5.2m | FOCUS POSITION FOR DEPTHS 1.8m~4.9m | FOCUS POSITION FOR DEPTHS 2.1m~5.0m | FOCUS POSITION FOR DEPTHS 2.0m~4.9m | FOCUS POSITION FOR DEPTHS 2.6m~4.8m |
| LONG-DISTANCE PRIORITY FOCUS (OPEN APERTURE) | FOCUS POSITION FOR DEPTHS 1.4m~∞m | FOCUS POSITION FOR DEPTHS 1.7m~∞m | FOCUS POSITION FOR DEPTHS 2.2m~∞m | FOCUS POSITION FOR DEPTHS 2.7m~∞m | FOCUS POSITION FOR DEPTHS 3.5m~∞m | FOCUS POSITION FOR DEPTHS 4.2m~∞m | FOCUS POSITION FOR DEPTHS 5.1m~∞m |
| LONG-DISTANCE PRIORITY FOCUS (UNOPEN APERTURE) | FOCUS POSITION FOR DEPTHS 0.9m~∞m | FOCUS POSITION FOR DEPTHS 1.0m~∞m | FOCUS POSITION FOR DEPTHS 1.4m~∞m | FOCUS POSITION FOR DEPTHS 1.8m~∞m | FOCUS POSITION FOR DEPTHS 2.4m~∞m | FOCUS POSITION FOR DEPTHS 3.0m~∞m | FOCUS POSITION FOR DEPTHS 3.7m~∞m |

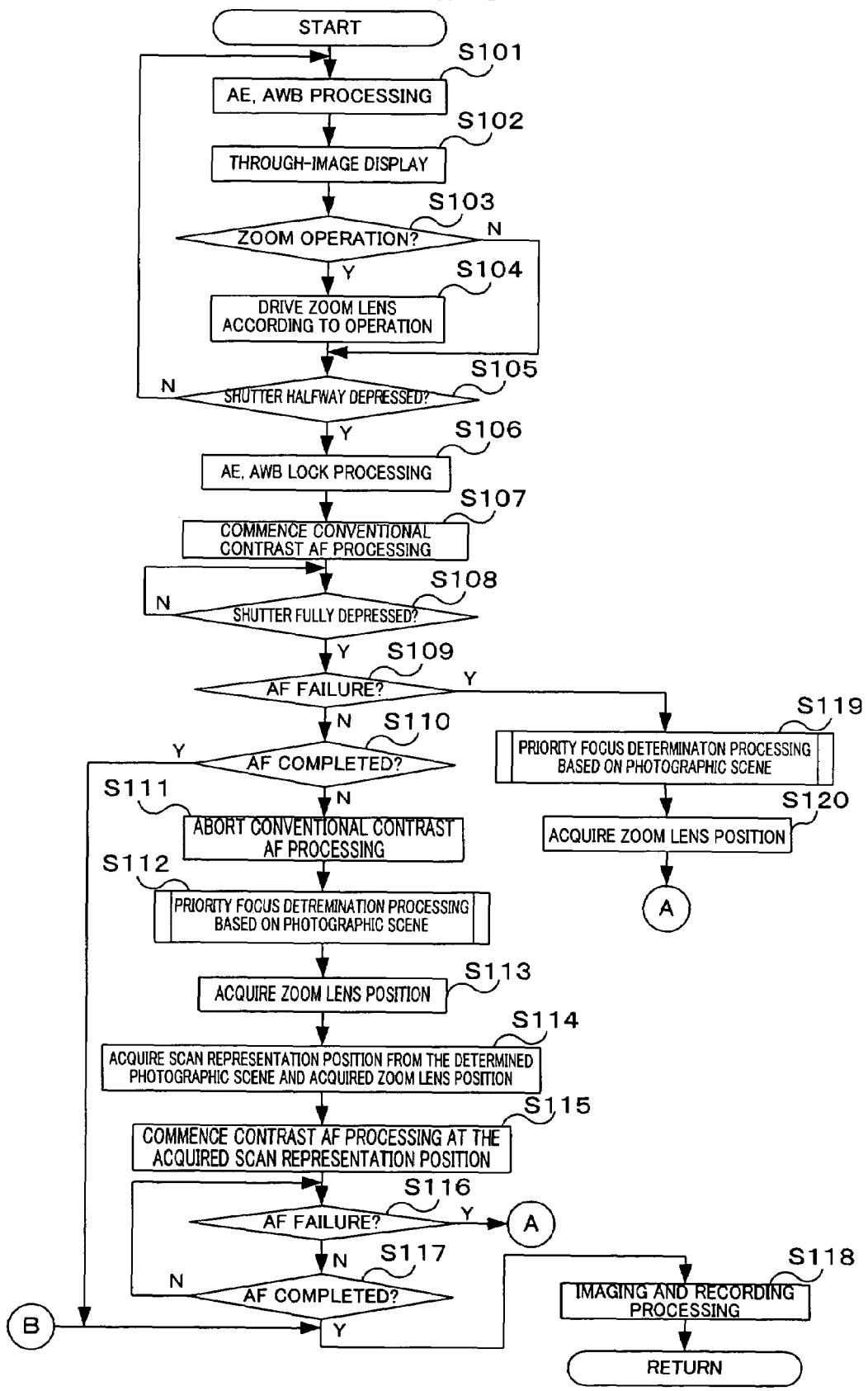

IMAGING APPARATUS HAVING AN AUTOFOCUS FUNCTION

CROSS-REFERENCE TO RELATED APPLICATION

This application is based upon and claims the benefit of priority from the prior Japanese Patent Application No. 2005-038589 filed Feb. 16, 2005, the entire contents of which are incorporated herein by reference.

BACKGROUND OF THE INVENTION

1. Field of the Invention

The present invention relates to an imaging device and a focusing method comprising a focus function enabling fast focusing on an object.

2. Description of the Related Art

In conventional imaging apparatus such as digital cameras, contrast auto-focusing (AF) processing is generally known as a method for performing auto-focusing on an object.

Contrast AF processing focuses by driving a focus lens within a drivable range from lens edge to lens edge, detecting the contrast component from an imaging signal which is the CCD output at this time and interpreting this waveform, namely, adjusting the lens into a lens position where the high-frequency component is the largest.

Additionally, an invention which is an automatic focusing device for cameras is disclosed in Japanese Laid-Open (Kokai) Patent Publication No. 2003-140027. Specifically, in contrast AF processing, power consumption required for the emission of AF fill light can be reduced when irradiating AF fill light onto an object to heighten the contrast of the object by emitting the AF fill light only when the image pickup lens moves a predetermined distance rather than emitting continuously during the movement duration of the image pickup lens.

However, according to the conventional imaging apparatus, since contrast is detected by moving the focus lens from lens edge to lens edge, AF processing takes time. This is problematic in that photo opportunities are lost when a user wishes to photograph an object quickly, such as at a decisive moment.

SUMMARY OF THE INVENTION

The present invention was made in light of the foregoing points.

In accordance with an aspect of the present invention, there is provided an imaging apparatus comprising an image pickup means for imaging an object; a contrast AF means for changing the lens position of a focus lens, as well as detecting the AF evaluated value of the imaged image picked up by the image pickup means, and moving the focus lens into a focused lens position based on a plurality of detected AF evaluated values; a judgment means for judging a photographic scene; and a first AF control means for focusing on an object by changing the lens position of the focus lens which detects the AF evaluated value of an imaged image picked up by the image pickup means by the contrast AF means in accordance to the photographic scene judged by the judgment means.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1B is a diagram showing various means actualized when the DSP/CPU 19 operates according to a program;

FIG. 2 shows an appearance of a scan representative position table stored in ROM 21;

FIG. 3 shows an appearance of a pan-focus position table stored in ROM 21;

FIG. 8 is a flowchart showing an operation of the digital camera according to a second embodiment.

DETAILED DESCRIPTION OF THE PREFERRED EMBODIMENTS

Hereinafter, the preferred embodiments of the present invention will be described with reference to the drawings as an example of application to a digital camera.

A. First Embodiment

A-1. Configuration of the Digital Camera

Figure 1A:
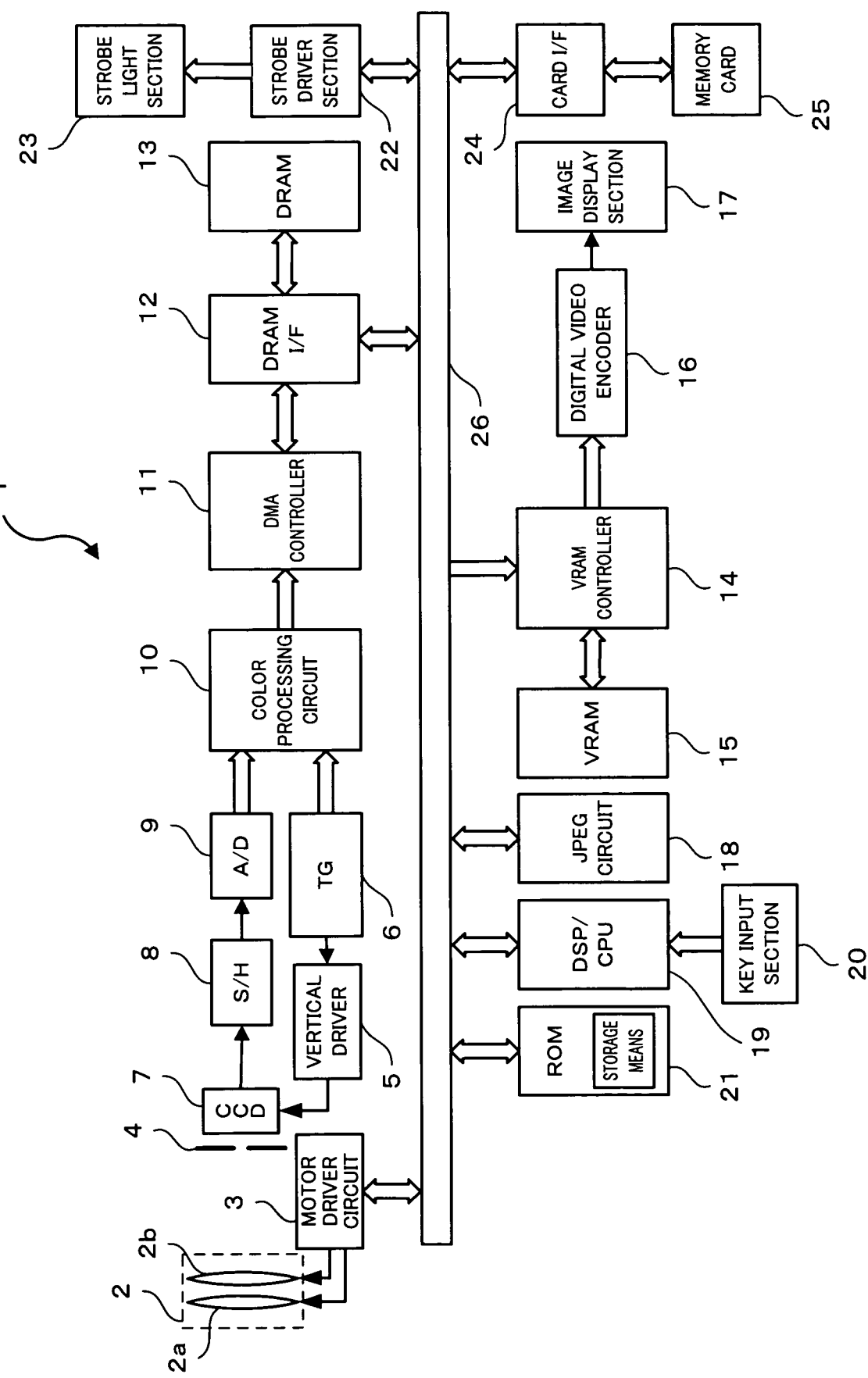
FIG. 1A is a block diagram of a digital camera in an embodiment of the present invention.

FIG. 1A is a block diagram showing the general electrical outline configuration of a digital cameral 1 which actualizes the imaging apparatus of the present invention. In addition, FIG. 1B is a diagram showing the various means actualized by operating the DSP/CPU 19 in accordance to a program.

In FIG. 1A, the digital camera 1 comprises an image pickup lens 2 (including focus lens 2a and zoom lens 2b), a motor driver circuit 3, an aperture/shutter combination 4, a vertical driver 5, a timing generator (TG) 6, a CCD 7 which is the imaging apparatus of the present invention, a sample and hold circuit 8, an analog and digital converter 9, a color processing circuit 10, a DMA controller 11, a DRAM interface 12, a DRAM 13, a VRAM controller 14, a VRAM 15, a digital video encoder 16, an image display section 17, a JPEG circuit 18, a DSP/CPU 19, a key input section 20, a ROM 21, a strobe driver section 22, a strobe light section 23, a card I/F 24, and a bus 26. In the card I/F 24, a memory card 25 can be connected which is easily removably attachable to the card slot of the digital camera 1 main body.

The image pickup lens 2 includes focus lens 2a, zoom lens 2b, etc., composed of a plurality of lens groups and is connected to the motor driver circuit 3. The motor driver circuit 3 is configured with a focus motor and a zoom motor for driving the focus lens 2a and zoom lens 2b in an optical axis direction, and a focus motor driver and a zoom motor driver for driving the focus motor and the zoom driver according to control signals sent from the DSP/CPU 19 (not shown), respectively.

The aperture/shutter combination 4 includes a driver circuit (not shown) which operates the aperture/shutter combination according to control signals sent from the DSP/CPU 19. This aperture/shutter combination functions as both an aperture and a shutter.

The aperture functions as the mechanism to control the amount of light which enters the image pickup lens 2. The shutter functions as the mechanism to control the time duration time for applying light to the CCD 7. The time duration for applying light to the CCD 7 changes according to the opening and closing speed of the shutter (shutter speed). Thus, an exposure can be determined according to this aperture and shutter speed.

The CCD 7, scan-driven by the vertical driver 5 and TG 6, photoelectrically converts the light intensity of the respective colors of the RGB value of an object image of which the image focus is formed at a constant frequency and outputs to the sample and hold circuit 8.

The sample and hold circuit 8 samples the analog signals sent from the CCD 7 at a frequency suited to the resolution of the CCD 7 (for example, correlative double sampling) and outputs to the analog and digital converter 9. Automatic gain control (AGC) can be performed after sampling.

The analog and digital converter 9 converts the sampled analog signal into a digital signal and outputs to the color processing circuit 10.

The color processing circuit 10 performs color process processing including pixel interpolation processing, gamma (y) correction processing, etc., and also generates luminosity color difference signals (YUV signals) from the RGB data.

The DMA controller 11 executes the transfer of data between the color processing circuit 10 and the DRAM 13 via the DRAM interface 12 without interference from the DSP/CPU 19.

The DRAM interface 12 is interfaced with a signal interface between the DMA controller 11 and the DRAM 13 and a signal interface between the DRAM 13 and bus 26.

The DRAM 13 is a type of rewritable semiconductor used as a working memory for the DSP/CPU 19 and also as a buffer memory to temporarily store the image data picked up by the CCD 7 (YUV signal generated in the color processing circuit 10).

The VRAM controller 14 is a section which controls the transfer of data between the VRAM 15 and bus 26 and between the VRAM 15 and digital video encoder 16. In other words, this section controls writing of the image data for display to the VRAM 15 and readout of this same data from the VRAM 15.

The VRAM 15 refers to a video RAM and is a memory for temporarily storing the image data of a reproduction image and through-image which is an object image acquired in real time, during imaging standby or during imaging, displayed as is without recording and saving.

The digital video encoder 16 converts the image data of the digital signals read out from the VRAM 15 into analog signals and outputs in sequence at a timing according to the scan mode of the image display section 17.

The image display section 17 displays the image of the image data of the analog signals sent from the digital video encoder 16.

The JPEG circuit 18 is a section which performs compression and expansion in JPEG (joint photographic experts group) format. The JPEG circuit 18 performs JPEG compression of image data (YUV signal) stored in the DRAM 13 and JPEG expansion of image data recorded on the memory card 25 according to the control signals of the DSP/CPU 19.

The key input section 20 includes a plurality of operation keys, such as a shutter button, zoom keys (telephoto key and wide angle key), a SET key, a cursor key, etc. The manipulation signals corresponding to the user's keystroke operations are outputted to the DSP/CPU 19.

The strobe driver section 22 provides the flash-drive of the strobe light section 23 according to a control signal from the DSP/CPU 19 and the strobe light section 23 performs the flash of light for the strobe. If the DSP/CPU 19 judges that a photographic scene is dark by the luminosity component of the CCD 7 output or a photometry circuit which is not shown, the DSP/CPU 19 sends a control signal to the strobe driver section 22.

The DSP/CPU 19 is a one-chip microcomputer which controls each section of the digital camera 1 described above. In addition, the DSP/CPU 19 includes a clock circuit which keeps date and time and which also functions as a timer.

The control programs required for each section of the DSP/CPU 19 are recorded in the ROM 21, namely programs and data required to perform various controls including AE, AF, etc. As shown in FIG. 1B, the DSP/CPU 19 functions as a contrast AF means, a phase difference AF means, a judgment means, a determination means, a first AF control means, a second AF control means, a third AF control means, a fourth AF control means, an optical zoom magnification setting means, an optical zoom means, a zoom lens position acquisition means, a focus position acquisition means, a PF position acquisition means, a range acquisition means, a distance acquisition means, a first failure judgment means, a second failure judgment means, a first judgment means, a second judgment means, a third judgment means, and a completion judgment means of the present invention by operating according to the aforementioned programs.

Additionally, a scan representation position table and a pan-focus position table are stored in the ROM 21. This ROM 21 functions as a storage means of the present invention.

FIG. 2 shows an appearance of the scan representation position table. The position of the zoom lens 2b and the focus position (sampling point) which is the scan representation position corresponding to priority focus type are recorded in the scan representation position table, respectively.

FIG. 3 shows an appearance of the pan-focus position table. The lens position of the zoom lens 2b and the focus position (sampling point) of the pan focus corresponding to the priority focus are recorded in the pan-focus position table, respectively.

As is clear from FIG. 2 and FIG. 3, the lens position of the zoom lens 2b is divided into seven stages: zoom 1, zoom 2 . . . zoom 7. Zoom 1 indicates a stage where zoom is barely performed (approximately ×1). Zoom 7 indicates a stage where zoom is performed to the fullest (zoom magnification is almost maximum).

In addition, there are three types of priority focus: short-distance priority focus, long-distance priority focus with open aperture, and long-distance priority focus with un-open aperture.

The focus position (AF search point) which is the scan representation position is determined from the table in FIG. 2 and the focus position of the pan-focus is consequently determined from the table in FIG. 3 by the lens position of the zoom lens 2b and the priority focus type.

For example, if the priority focus type is the long-distance priority focus with open aperture and the lens position of the zoom lens 2b is zoom 3, there are three points of focus positions which are the scan representation positions: a focus position for depths 1.2 m to 2.2 m, a focus position for depths 1.6 m to 4.6 m, and a focus position for depths 2.5 m to ∞m. The pan-focus position is a focus position of 2.2 m to ∞m. Here, although there are three points of focus positions which are scan representation positions, it can be two points or four points as long as there are plural points.

These focus positions are the positions of the lens in relation to the reference position within the camera. Although lens positions where the imaging depth falls within the specified range are calculated in advance and stored, the lens position can be determined by calculation on a case-by-case basis. In addition, the lens position can be detected by sensors and can be detected by the driving pulse count of a stepping motor and the like.

Among the priority focus types and the three points which are the scan representation positions corresponding to the lens position of the zoom lens $2b$, the distances between the focus position positioned in the center and the focus positions positioned on both sides are the same. In other words, if the three points of focus positions which are the scan representation positions are focus position 1, focus position 2, and focus position 3, and focus position 2 is positioned between focus position 1 and focus position 3, the distance between focus position 1 and focus position 2 and the distance between focus position 2 and focus position 3 are the same.

For example, if the foregoing three points of focus positions are a focus position for depths 1.2 m to 2.2 m, a focus position for depths 1.6 to 4.6 m and a focus position for depths 2.5 m to ∞m, the distance between the focus position for depths 1.2 m to 2.2 m and the focus position for depths 1.6 to 4.6 m and the distance between the focus position for depths 1.6 to 4.6 m and the focus position for depths 2.5 m to ∞m are the same.

In addition, this distance is larger than the sampling interval of the search-drive by the conventional contrast AF processing.

A-2. Operation of the Digital Camera

Hereinafter, the functions of the respective configurations of the digital camera 1 serving as the features of the present invention will be explained.

The operation of the digital camera 1 in the first embodiment will be explained according to the flowcharts in FIG. 4 and FIG. 5.

When the power supply of the digital camera 1 is turned "ON" by operation of the power key of the user's key input section 20, the DSP/CPU 19 commences imaging by the CCD 7, performs an AE processing at a focal distance corresponding to the current lens position of the zoom lens $2b$, and performs image processing such as white balance processing in the color processing circuit 10 (Step S1).

Then, after setting exposure, white balance, etc., the DSP/CPU 19 stores the image data picked up by the CCD 7 in the DRAM 13, stores the stored image data in the VRAM 15, and displays the imaged image data on the image display section 17 via the digital video encoder 16. This is referred to as through-image display (Step S2).

Next, the DSP/CPU 19 judges whether or not manipulation of the zoom keys of the user's key input section 20 has been executed (Step S3). This judgment judges whether or not a manipulation signal corresponding to the manipulation of the zoom keys has been sent from the key input section 20.

If judged there has been manipulation of a zoom key in Step S3, the zoom lens is driven according to the manipulation of the zoom key by the user (according to the manipulation signal sent from the key input section 20) in Step S4 and the process advances to Step S5. If judged there has not been manipulation of a zoom key in Step 3, the process advances directly to Step S5. For example, when judged that the zoom telephoto key has been manipulated by the user, the zoom lens $2b$ is driven in the direction toward an object along the optical axis and when the wide angle key has been manipulated by the user, the zoom lens $2b$ is driven toward the photographer along the optical axis.

When advancing to Step S5, the DSP/CPU 19 judges whether or not the shutter button has been halfway depressed by the user. This judgment is made according to whether or not a manipulation signal corresponding to the halfway depression of the shutter button has been sent from the key input section 20. If the signal has been sent, the DSP/CPU 19 judges that the shutter button has been halfway depressed.

If judged that the shutter button has not been halfway depressed in Step S5, the process returns to Step S1. If judged that the shutter button has been halfway depressed in Step S5, the DSP/CPU 19 determines and locks imaging conditions such as exposure values (aperture value, shutter speed, amplification rate) based on the through-image acquired immediately before halfway depression, as well as judging which mode the strobe mode is in from among forced lighting mode, auto-strobe mode and light prohibited mode. When in auto-strobe mode, the DSP/CPU 19 also judges whether or not the luminosity component of the output signal of the CCD 7 (the though 0 image acquired immediately before halfway depression) or the image picked up by the photometry circuit (not shown) is dark, judges whether or not to perform the flash of light for the strobe, locks the imaging conditions such as strobe light ON/OFF (Step S6), and starts the timer (Step S7).

Then, the DSP/CPU 19 judges whether or not time is up (Step S8). This judgment of whether or not the time is up is judged by whether or not the timer has passed a predetermined time duration (here, 0.1 s). This predetermined time duration can be set in advance or can be set by the user.

If judged that the time is not up in Step S8, the DSP/CPU 19 judges whether or not the shutter button has been fully depressed (Step S9). This judgment is judged by whether or not a manipulation signal corresponding to full depression of the shutter button has been sent from the key input section 20. If judged that the shutter button has not been fully depressed in Step S9, the process returns to Step S8.

Before judging that a predetermined duration has passed, if judged that the shutter button has been fully depressed before the passage of 0.1 s since halfway depressing the shutter button (N in Step S8; Y in Step S9), the DSP/CPU 19 judges that a fast imaging is required. The process advances to Step S1 and a fast contrast AF processing, namely the AF processing serving as a feature of the present invention, commences.

On the other hand, if the time is up before the shutter button is fully depressed (Y in Step S8), the DSP/CPU 19 judges that a fast imaging is not required. The process advances to Step S17 and a conventional contrast AF processing commences.

It is judged that the user has fully depressed the shutter button at once when the shutter button is fully depressed before the predetermined time duration has passed since halfway depressing the shutter button. However, if the manipulation signal corresponding to the halfway depression of the shutter button is not detected by the DSP/CPU 19 unless the shutter button is held in the halfway-depressed state for more than the predetermined time duration, it can be judged that the user has fully depressed the shutter button at once if only the manipulation signal corresponding to the full depression of the shutter button is detected without detection of the manipulation signal corresponding to the halfway depression of the shutter button.

In detail, if judged that the shutter button has not been halfway depressed in Step S5, the DSP/CPU 19 judges whether or not the shutter button has been fully depressed. If judged that the shutter button had not been fully depressed as well, the process returns to Step S1. On the other hand, if the manipulation signal corresponding to halfway depression is detected, the process advances to Step S6, locks the imaging conditions such as AE, AWB, etc., and advances directly to Step S17. If the manipulation signal corresponding to full depression is detected without detecting the manipulation signal corresponding to halfway depression, the process advances to Step S6, locks the imaging conditions such as AE, AWB, etc., and advances directly to Step S10.

Next, the AF processing serving as a feature of the present invention is described.

When the shutter button is fully depressed before the time is up (Y in Step S9), the DSP/CPU 19 performs a priority focus determination processing based on the photographic scene (Step S10). In other words, the current photographic scene is judged and the type of priority focus is determined from the judged photographic scene. This determination processing will be described in detail hereafter. The types of priority focus are short-distance priority focus, long-distance priority focus with an open aperture, and long-distance priority focus with an un-open aperture.

Next, the DSP/CPU 19 acquires the current lens position of the zoom lens 2b (Step S11). This zoom lens 2b lens position is classified into seven stages, from zoom 1 to zoom 7. Zoom 1 indicates a stage where zoom is not or is barely performed. Zoom 7 indicates a stage where zoom is performed to maximum.

Then, the DSP/CPU 19 acquires the scan representation position from the priority focus type determined in Step S10 and the zoom lens 2b lens position acquired in Step S11 (Step S12). In this scan representation position acquisition, the focus position which is the scan representation position is acquired from the scan representation position table stored in the ROM 21.

For example, when judged that the priority focus is the short-distance priority focus from the current photographic scene in Step S10 and the zoom lens 2b lens position acquired in Step 11 is zoom 4, three points of focus positions are acquired as the focus positions which becomes the scan representation positions: a focus position for depths 1.3 m to 2.3 m, a focus position for depths 2.0 m to 5.0 m, and a focus position for depths 2.5 m to 10.0 m.

Then, after acquiring the focus positions which become the scan representation positions, the DSP/CPU 19 starts the contrast AF processing (the AF processing serving as a feature of the present invention) based on the acquired three points of focus positions (Step S13). Simply described, this AF processing serving as a feature of the present invention limits the lens positions of the focus lens 2a detecting the AF evaluated value (contrast value) by the contrast AF processing to the acquired three points of focus positions and drives the focus lens 2a to the focus position, among these, which has the highest AF evaluated value.

Hereafter, the AF processing serving as a feature of the present invention is described in comparison to conventional contrast AF processing.

Figure 6A:
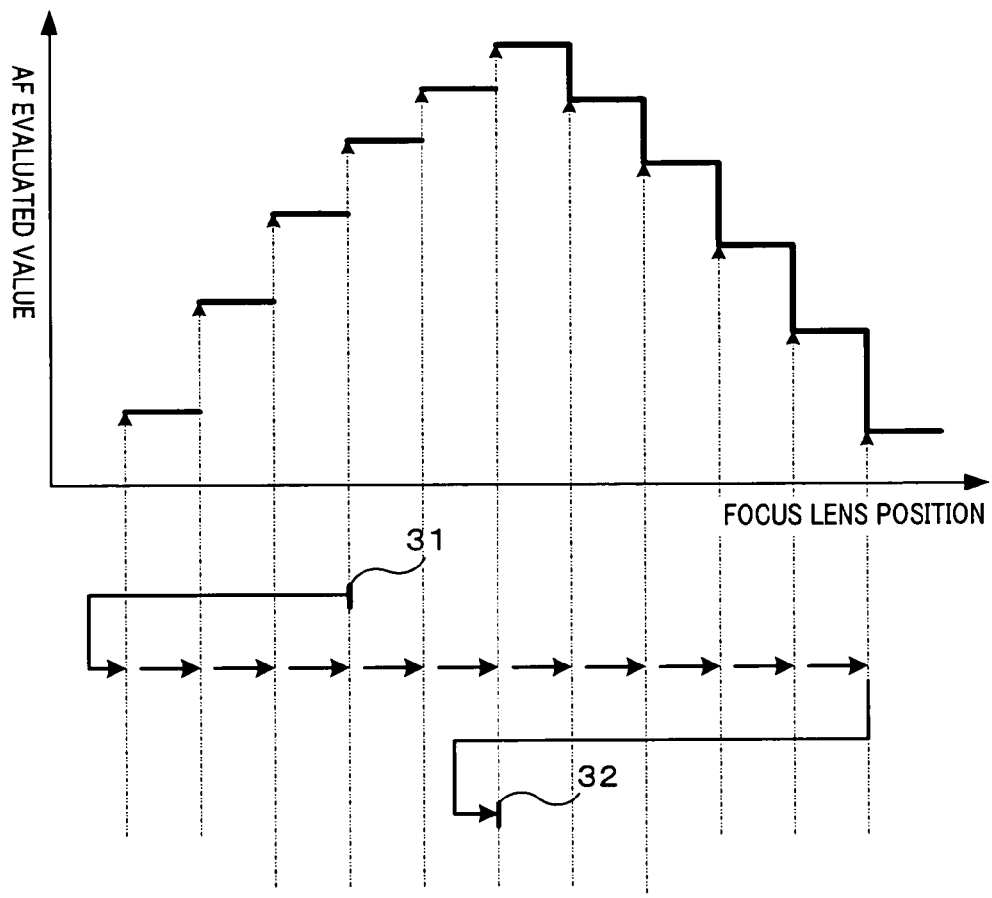
FIG. 6A is a diagram showing a positional transition of focus lens 2a search-driven by contrast AF processing.

FIG. 6A is a diagram showing a positional transition of the focus lens 2a search-driven by the conventional contrast AF processing and the correlation with AF evaluated value at this time.

Figure 6B:
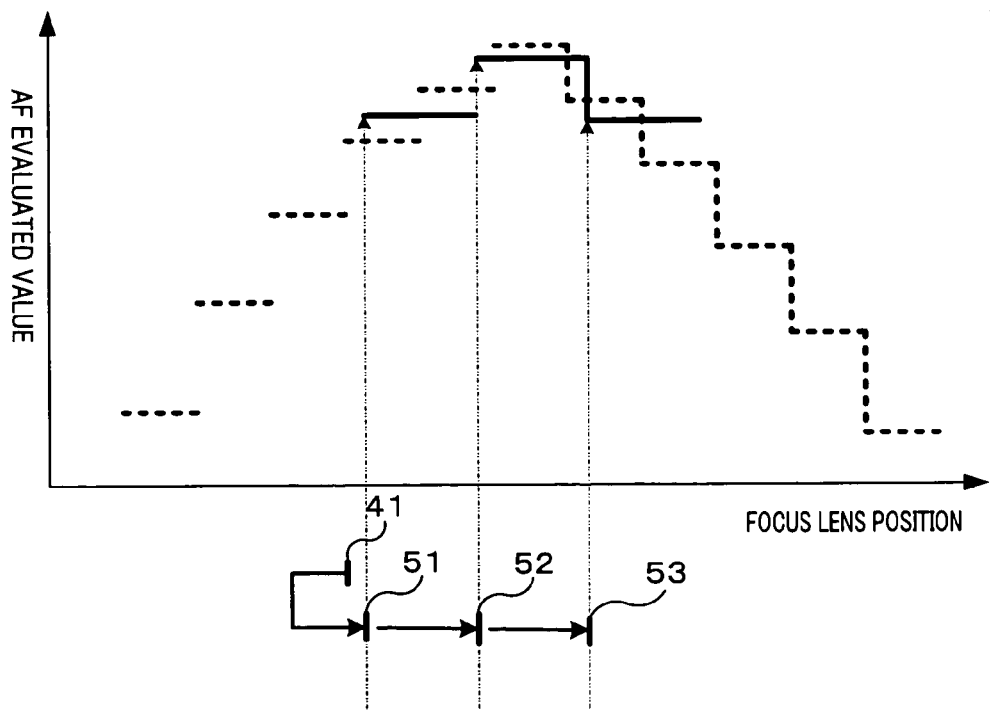
FIG. 6B is a diagram showing the correlation with AF evaluated values at this time.

FIG. 6B is a diagram showing a positional transition of the focus lens 2a search-driven by the contrast AF processing serving as a feature of the present invention and the correlation with AF evaluated value at this time.

During the conventional contrast AF processing, the focus lens 2a is moved from the current focus lens 2a lens position (here, lens position 31) to the closest lens edge. The CCD 7 executes imaging processing at this focus lens position and the AF evaluated value is detected at this time. Next, the movement of the focus lens 2a recommences, the focus lens 2a being shifted one segment (one step). The CCD 7 executes imaging processing at this focus lens position and the AF evaluated value is detected at this time. Then, the focus lens 2a is shifted one segment again, the CCD 7 executes imaging processing at this focus lens position and the AF evaluated value is detected at this time. This operation is performed until the focus lens 2a moves to the other lens edge. In this manner, in the conventional contrast AF processing, AF evaluated values are detected while driving the focus lens 2a from lens edge to lens edge in predetermined sampling intervals.

Here, one segment refers the distance the focus lens 2a is moved at one time. In FIG. 6A, this movement distance is the distance of the arrow from broken line part to broken line part. Additionally, because the AF evaluated value is calculated according to the high-frequency component included in an imaging signal picked up by the CCD 7, the higher an AF evaluated value the focus lens 2a lens position has, the more focused the image.

Furthermore, the focus lens position with the highest AF evaluated value is detected by comparing the plurality of AF evaluated values detected for each focus lens position and the focus lens 2a is driven to the detected lens position. In FIG. 6, the lens position with the highest AF evaluated value is position 32, and therefore, the object is focused by driving the focus lens 2a to the lens position 32.

On the other hand, when the AF processing serving as a feature of the present invention is executed, the focus lens 2a is moved to the focus position closest to the current focus lens 2a lens position among the three acquired focus positions (focus lens 2a lens positions) which become scan representation positions. Here, the acquired three points of focus positions are focus position 51, focus position 52, and focus position 53, as shown in FIG. 6B, and the current focus lens 2a lens position is lens position 41. Therefore the focus lens 2a is moved to focus position 51 which is closest to lens position 41, the CCD 7 performs imaging processing at this focus lens position, and the AF evaluated value is detected at this time. Next, the focus lens 2a is moved to focus position 52, the CCD 7 performs imaging processing at this focus lens position, and the AF evaluated value is detected at this time. Then, the focus lens 2a is moved to focus position 53, the CCD 7 performs imaging processing at this focus lens position, and the AF evaluated value is detected at this time. In other words, the AF evaluated values are detected only for focus positions acquired as the scan representation positions.

During the AF processing serving as a feature of the present invention, the movement distance at one time (one segment) is determined according to the acquired focus positions. However, as is clear when comparing FIG. 6A and FIG. 6B, the movement distance at one time (one segment) in the AF processing serving as a feature of the present invention is greater than the movement distance in the conventional contrast AF processing. This movement distance at one time is the distance of the arrow from the broken line part to the broken line part in FIG. 6B. Additionally, the movement distance at one time (one segment) in the AF processing serving as a feature of the present invention also differs according to the zoom lens 2b lens position and the priority focus type.

Furthermore, in the AF processing serving as a feature of the present invention, the AF search range is determined according to the acquired focus position. However, as is clear when comparing FIG. 6A and FIG. 6B, the AF search range (51 to 53) in the AF processing serving as a feature of the present invention is narrower than the AF search range (from one lens edge to the other lens edge) in the conventional contrast AF processing. Additionally, the AF search range in the AF processing serving as a feature of the present invention also differs according to the zoom lens 2b lens position and the priority focus type.

The AF evaluated values indicated by the dotted lines in FIG. 6B show the AF evaluated values detected by the conventional contrast AF processing correspond with FIG. 6A. Additionally, the AF evaluated values indicated by the solid lines show the AF evaluated values detected at the focus positions acquired as the scan representation positions.

In other words, a focus position where the sampling interval during the search drive of the AF processing serving as a feature of the present invention is larger than the sampling interval during the search drive of the conventional contrast AF processing and the search range during the search drive of the AF processing serving as a feature of the present invention is much narrower than the search range during the search drive of the conventional contrast AF processing is recorded to the scan representation position table in the ROM 21 in advance.

Then, the focus lens 2a is moved to the focus position where the AF evaluated value is the highest among the AF evaluated values at the detected three points of focus positions. In FIG. 6B, the focus position where the AF evaluated value is the highest is focus position 52, and therefore, the object is focused by moving the focus lens 2a to the focus position 52.

Figure 4:
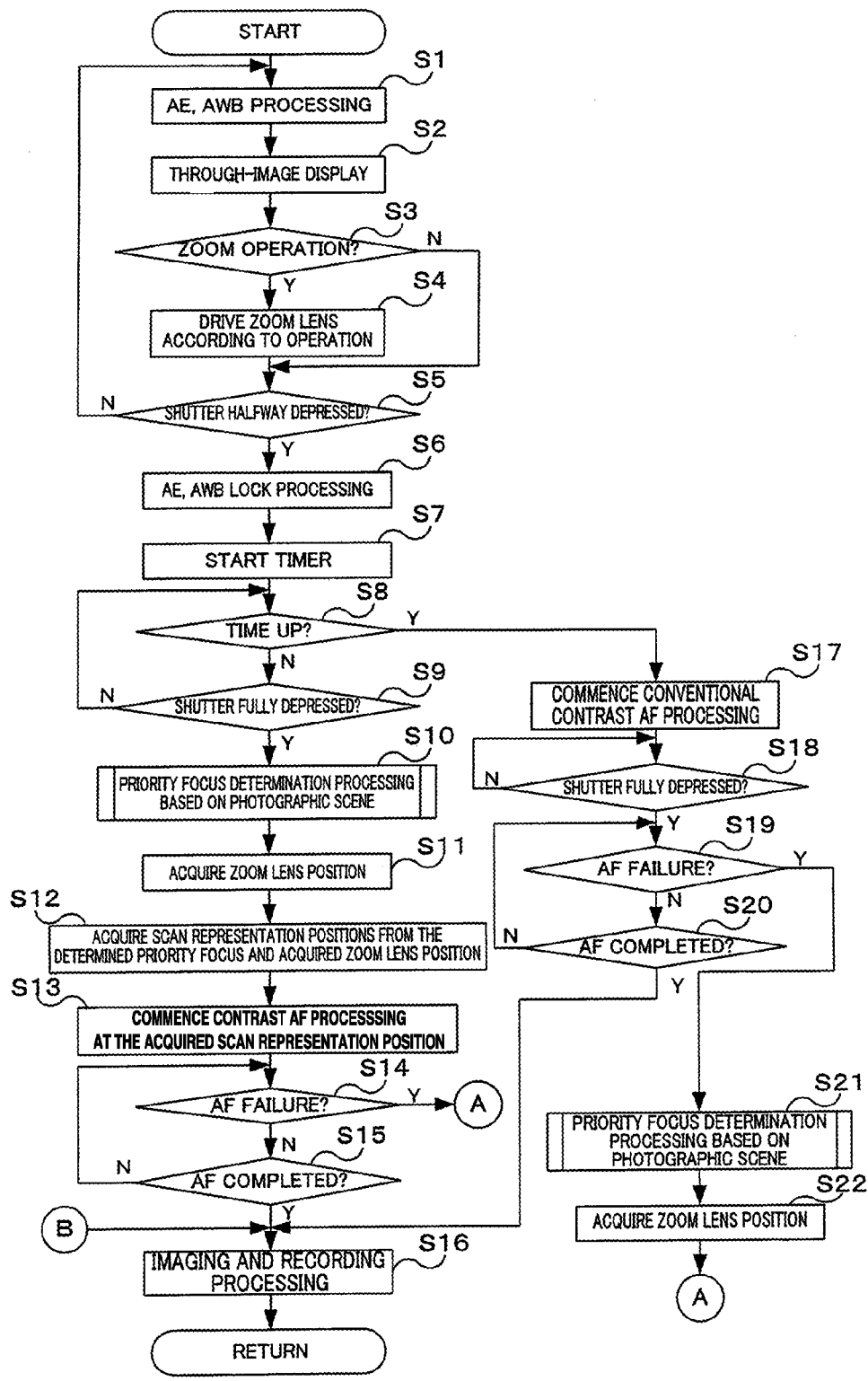
FIG. 4 is a flowchart showing an operation of the digital camera according to a first embodiment.

Returning to the flowchart in FIG. 4 and commencing the AF processing serving as a feature of the present invention in Step S13, the DSP/CPU 19 judges whether or not the contrast AF processing has failed (Step S14). An example of an AF processing failure is when the lens position of the focus lens 2a where the AF value peaks (apex of a mountain form) cannot be detected.

If judged that the contrast AF processing has not failed in Step S14, the DSP/CPU 19 judges whether or not the contrast AF processing has been completed (successful) (Step S15). If judged that the contrast AF processing has not been completed, the process returns to Step S14.

If judged that the contrast AF processing has failed before judging that the AF processing has been completed (Y in Step S14), the process advances to Step S23 in order to perform AF processing by pan-focusing. This AF processing by pan-focusing will be described in detail hereafter.

If judged that the contrast AF processing has been completed without judging that the contrast AF has failed (Y in Step S15) or, namely, the focus lens is moved to a focus position where the AF evaluated value is the highest among the acquired three points of focus positions, still-image processing is performed under the imaging conditions locked in Step S6. Thereafter, the acquired image data is stored in the DRAM 13 and a JPEG format image file is created from the stored image data and recorded on the memory card 25 (Step S16).

As is clear in FIG. 6B, the focus lens 2a is moved to focus position 52 because it has the highest AF evaluated value, still-image processing is performed under the locked imaging conditions, and the acquired image data is recorded on the memory card 25.

Next, conventional contrast AF processing is described.

If judged that the time is up (Y in Step S8) before judging that the shutter button has been fully depressed (Y in Step S9), the DSP/CPU 19 judges that fast imaging is not required and commences the conventional contrast AF processing (Step S17). In other words, AF processing is started where the focus lens 2a is search-driven from lens edge to lens edge within a lens-drivable range and the focus lens 2a is driven to the position with the highest AF evaluated value. The conventional AF processing has been described above and therefore will be omitted herein.

If the highest AF evaluated value is detected during the search-drive of the focus lens 2a, the search-drive of the focus lens 2a can be aborted and the focus lens 2a can be driven to the focus position where the detected contrast is the peak value.

When the AF processing commences, the DSP/CPU 19 judges whether or not the shutter button has been fully depressed (Step S18). If the shutter button has not been fully depressed, the process remains at Step S18 until the shutter button is fully depressed. If the shutter button has been fully depressed, the DSP/CPU 19 judges whether or not the conventional contrast AF processing has failed (Step S19).

If judged that the conventional contrast AF has not failed in Step S19, the DSP/CPU 19 judges whether or not the contrast AF processing has been completed (successful) (Step S20).

If judged that the contrast AF processing has not been completed in Step S20, the process returns to Step S19.

If judged that the AF processing has been completed by the conventional contrast detection method (Y in Step S20) without judging that the conventional contrast AF processing has failed (N in Step S19) or, in other words, the peak value of the contrast value (AF evaluated value) has been detected and the focus lens 2a has been moved to the lens position of the detected peak value, the process advances to Step S16, still-image processing is performed under the locked imaging conditions, and the acquired image data is recorded on the memory card 25.

When described using FIG. 6A, the AF evaluated value is the highest at lens position 32. Therefore, the focus lens 2a is moved to lens position 32, still-imaging processing is performed under the locked imaging conditions, and the acquired image data is recorded to the memory card 25.

On the other hand, if judged that the AF processing has failed before judging that the conventional contrast AF processing has been completed, the DSP/CPU 19 first performs priority focus determination processing based on the photographic scene in order to perform AF processing by pan-focusing.

Subsequently, the DSP/CPU 19 acquires the current lens position of the zoom lens 2b (Step S22), the process advances to Step S23 in FIG. 5, and the AF processing by pan-focusing is performed.

Next, the AF processing by pan-focusing will be described.

When judged that the contrast AF processing has failed in Step S14 or judged that the conventional contrast AF processing has failed in Step S19 and the zoom lens 2b lens position has been acquired in Step S22, the process advances to Step S23 and the DSP/CPU 19 judges whether or not the priority focus type determined in Step S10 or Step S21 is a short-distance priority focus. In other words, when advancing from Step S14 in FIG. 4 to Step S23 in FIG. 5, judgment is made based on the priority focus determined in Step S10. When advancing from Step S22 in FIG. 4 to Step S23 in FIG. 5, judgment is made based on the priority focus determined in Step S21.

If judged that the priority focus is a short-distance priority focus in Step S23, the DSP/COU 19 acquires the focus position from the pan-focus position table stored in the ROM 21 based on the zoom lens 2b lens position acquired in Step S11 or Step S22 in FIG. 4 and the short-distance priority focus (Step S24) and the process advances to Step S28.

For example, if the zoom lens 2b lens position is zoom 4, a pan-focus focus position for depths 1.8 m to 4.9 m is acquired.

On the other hand, if judged that the priority focus is not the short-distance priority focus, the process proceeds to Step S25 and the DSP/CPU 19 judges whether or not the priority focus type determined in Step S10 or Step S21 is a long-distance priority focus with an open aperture.

If judged that the priority focus is the long-distance priority focus with an open aperture in Step S25, the focus position is acquired from the pan-focus position table stored in the ROM 21 (Step S26) based on the zoom lens 2b lens position acquired in Step S11 or Step S22 in FIG. 4 and the long-distance priority focus with an open aperture and the process advances to Step S28.

On the other hand, if judged that the priority focus is not the long-distance priority focus with an open aperture in Step S25, the DSP/CPU 19 judges that the priority focus is a long-distance priority focus with an un-open aperture and the process advances to Step S27. The focus position is acquired from the pan-focus position table stored in the ROM 21 based on the zoom lens 2b lens position acquired in Step S11 or Step S22 in FIG. 4 and the long-distance priority focus with an un-open aperture and the process advances to Step S28.

When advancing to Step S28, the DSP/CPU 19 moves the focus lens 2b to the acquired focus position, the process advances to Step S16 in FIG. 4, still-image processing is performed under the locked imaging condition, and the acquired image data is recorded to the memory card 25.

Figure 7:
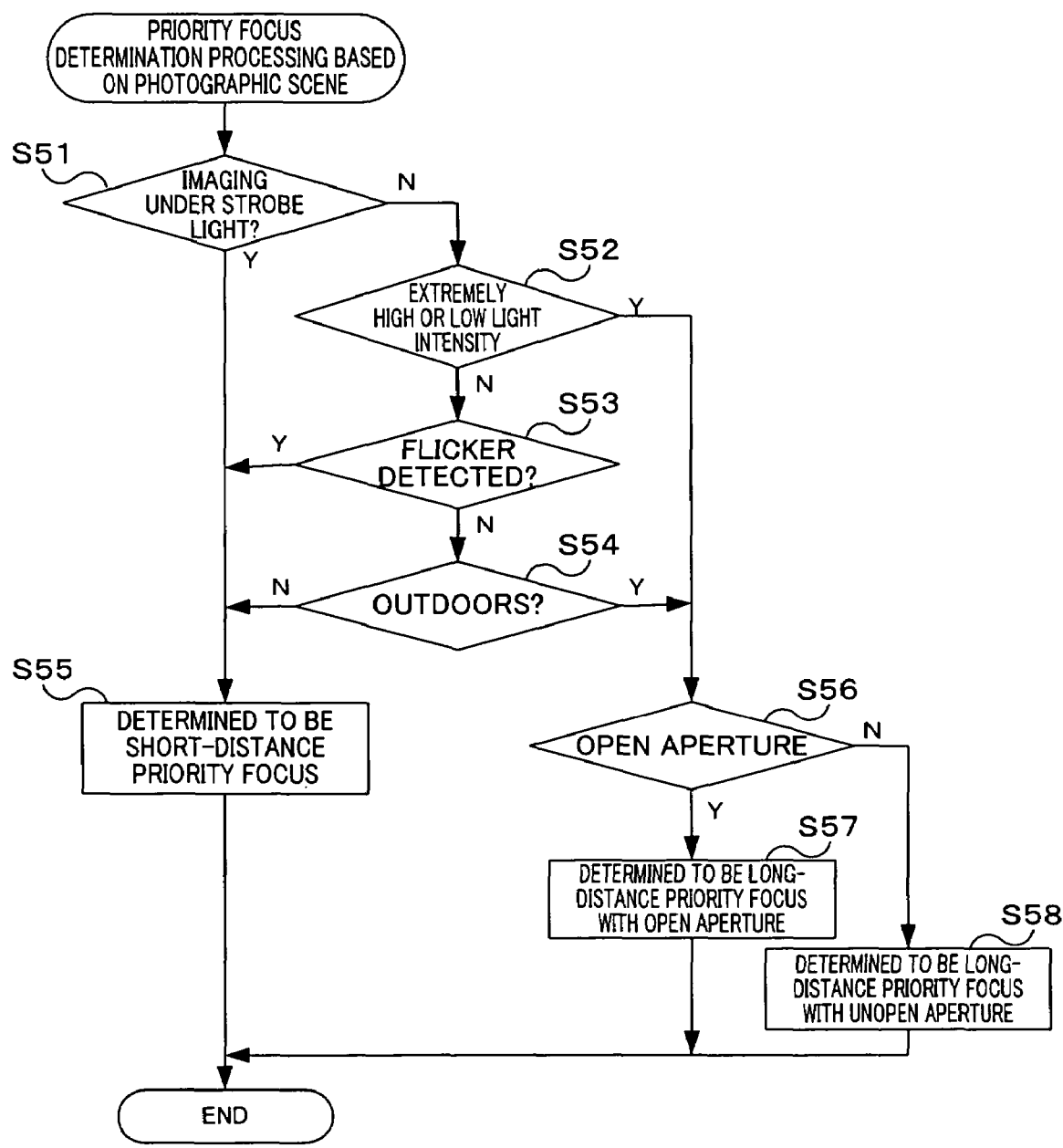
FIG. 7 is a sub flowchart showing a priority focus determination processing based on the photographic scene.

Next, the priority focus determination processing based on the photographic scene is described according to the sub flowchart in FIG. 7.

Here, the photographic scene is judged by judgment of whether or not the image is picked up under strobe light, whether or not the light intensity is extremely high or extremely low, whether or not a flicker is detected, whether or not it is outdoors, and whether or not the aperture is open. Based on the judged photographic scene, the determination processing is executed on whether or not the priority focus is a short-distance priority focus, a long-distance priority focus with an open aperture, or a long-distance priority focus with an un-open aperture.

When advancing to Step S10 or Step S21 in FIG. 4, the process advances to Step S51 in FIG. 7 and the DSP/CPU 19 judges whether or not the image has been picked up under strobe light. This judgment is judged by the imaging conditions locked in FIG. 4.

If judged that the image was picked up under strobe light, the process advances to Step S55. If judged that the image was not picked up under strobe light, the process advances to Step S52.

When judged that the image was not picked up under strobe light and the process advances to Step S52, the DSP/CPU 19 judges whether or not the light intensity is extremely high or extremely low based on the imaging conditions locked in Step S6 in FIG. 4 (or the through-image acquired when halfway depressing or fully depressing the shutter button). If judged that the light intensity is extremely high or extremely low, the process advances to Step S56. If judged that the light intensity is neither extremely high nor extremely low, the process advances to Step S53. This judgment of extremely high light intensity and extremely low light intensity is judged by the electric charge quantity to which the light irradiated to the CCD 7 had been converted.

When judged that the light intensity is neither extremely high nor extremely low and the process advances to Step S53, the DSP/CPU 19 judges whether or not a flicker has been detected from the through-image acquired when the shutter button was halfway depressed or fully depressed. If a flicker has been detected, the process advances to Step S55. If a flicker has not been detected the process advances to Step S54.

When a flicker has not been detected and the process advances to Step S54, whether the photographic location is outdoors or indoors is judged. When judged that the white balance of the imaging conditions locked in Step S6, namely, the color temperature of the light source of the light acquired by the automatic white balance processing in the color processing circuit 10, is the color temperature of sunlight, the photographic location is judged to be outdoors. When judged that the color temperature of the light source of the light acquired by the automatic white balance processing is not the color temperature of sunlight, the photographic location is judged to be indoors. If judged that the photographic location is not outdoors in Step S54, the process advances to Step S55. If judged that the photographic location is outdoors, the process advances to Step S56.

If judged that the image was picked up under strobe light in Step S51, judged that a flicker was detected in Step S53, or judged that the photographic location is not outdoors in Step S54, the priority focus is determined to be the short-distance priority focus (Step S55).

On the other hand, if judged that the light intensity is extremely high or extremely low in Step S52 or judged that the photographic location is outdoors in Step S54, the process advances to Step S56 and the DSP/CPU 19 judges whether or not the aperture is open. This judgment is made based on the imaging conditions locked in Step S6.

If judged that the aperture is open in Step S56, the priority focus is determined to be the long-distance priority focus with an open aperture (Step S57). If judged that the aperture is not open, the priority focus is determined to be the long-distance priority focus with un-open aperture (Step S58).

Then, when the priority focus is determined, the process advances to Step S11 or Step S22 in FIG. 4.

The priority focus type is determined from the photographic scene in this manner.

A-3. Effect

As described above in the first embodiment, when judged whether or not a predetermined time duration has passed since halfway depressing the shutter button and the shutter button has been fully depressed before the passage of the predetermined duration (including when the shutter button is fully depressed at once), it is judged that a fast imaging is required. Then, the focus positions which become the scan representation position are acquired based on the current photographic scene, the AF evaluated values of the acquired focus positions are detected, and the contrast AF processing is performed. Thus, the object can be focused quickly.

In addition, the priority focus type is determined and the scan representation positions which differ according to the determined priority focus type are acquired. Thus, focus can be made according to the imaging situation and the object can be focused quickly and accurately.

Furthermore, if the predetermined time duration passes after the shutter button has been halfway depressed without the shutter button being fully depressed, the conventional contrast AF processing is executed. Thus, the object can be focused accurately when fast imaging is not required.

Still further, if judged that the contrast AF processing has failed, the AF processing is executed by pan-focusing. Thus, the object can be focused quickly.

Still further, the priority type is determined and the focus positions of the pan-focus which differs according to the determined priority type are acquired. Thus, focus can be made according to the imaging situation and the object can be focused quickly and accurately.

Still further, the focus positions of the pan-focus which differ according to the current lens position of the zoom lens 2b are acquired. Thus, focus appropriate for the current zoom lens position can be made and the object can be focused quickly and accurately.

B. Second Embodiment

A second embodiment is described hereinafter.

In the foregoing first embodiment, the conventional contrast AF processing is executed when a predetermined time duration has passed since halfway depressing the shutter button without full depression. However, in the second embodiment, when the shutter button has been halfway depressed, the conventional contrast AF processing commences immediately and the AF processing serving as a feature of the present invention is executed when the conventional contrast AF processing has not been completed when the shutter button is fully depressed.

B-1. Operation of the Digital Camera 1

The second embodiment also actualizes the imaging apparatus of the present invention by implementing the digital camera 1 having the same configuration as that shown in FIG. 1A. Hereafter, the operation of the digital camera 1 in the second embodiment will be explained according to the flow-chart in FIG. 8.

When the power supply of the digital camera 1 is turned "ON" by operation of the power key of the user's key input section 20, the DSP/CPU19 performs AE processing, AWB processing and the like. (Step S101).

Next, the DSP/CPU 19 displays the through-image of the object picked up by the CCD 7 on the image display section 17 (Step S102).

Then, the DSP/CPU 19 judges whether or not the zoom keys have been manipulated by the user (Step S103). If zoom keys have been manipulated by the user, the zoom lens 2b is driven according to the manipulation (Step S104) and the process advances to Step S105. If zoom keys have not been manipulated by the user, the process advances directly to S105.

When advancing to Step S105, the DSP/CPU 19 judges whether or not the user has halfway-depressed the shutter button.

If judged that the shutter button has not been halfway depressed in Step S105, the process returns to Step S101. If the shutter button has been halfway depressed, the DSP/CPU 19 determines and locks imaging conditions such as exposure values (aperture value, shutter speed, amplification rate) based on the through-image acquired immediately before halfway depressing, as well as judging which mode the strobe mode is in from among forced lighting mode, auto-strobe mode and light prohibited mode. When in auto-strobe mode, the DSP/CPU 19 also judges whether or not the luminosity component of the output signal of the CCD 7 (the through-image acquired immediately before halfway depressing) or the image picked up by the photometry circuit (not shown) is dark, judges whether or not to perform the flash of light for the strobe, locks the imaging conditions such as strobe light ON/OFF (Step S106), and starts the conventional contrast AF processing (Step S107). This conventional contrast AF processing has been explained in the first embodiment and therefore will be omitted.

Next, the DSP/CPU 19 judges whether or not the shutter button has been fully depressed (Step S108).

If the shutter button has not been fully depressed in Step S108, the process remains at Step S108 until fully depressed. If the shutter button has been fully depressed in Step S108, the DSP/CPU 19 judges whether or not the conventional contrast AF processing has failed (Step S109).

If judged that the conventional contrast AF processing has not failed in Step S109, the DSP/CPU 19 judges whether or not the conventional contrast AF processing has been completed (Step S110).

If judged that the conventional contrast AF processing has been completed in Step S110, the DSP/CPU 19 performs still-image processing under the imaging conditions locked in Step S106. Then, the acquired image data is stored in the DRAM 13 and a JPEG format image file is created from the stored image data and recorded on the memory card 25 (Step S118).

On the other hand, if judged that the conventional contrast AF processing has not been completed in Step S110, the DSP/CPU 19 aborts the conventional contrast AF processing currently being performed (Step S111). At this time, the movement of the search-driven focus lens 2a is also halted.

Then, after the conventional contrast AF processing is aborted, the DSP/CPU 19 performs priority focus determination processing based on the photographic scene (Step S112) and acquires the current lens position of the zoom lens 2b (Step S113).

Next, the DSP/CPU 19 acquires three points of focus positions which become scan representation positions from the scan representation position table recorded in the ROM 12 based on the focus type determined in Step S111 and the zoom lens 2b lens position acquired in Step S112 (Step S114).

Then, the DSP/CPU 19 starts the contrast AF processing (the AF processing serving as a feature of the present invention) based on the acquired three points of focus positions which become the scan representation positions (Step S115). This AF processing which serves as a feature of the present invention has been explained in the first embodiment and therefore will be omitted herein.

Next, the DSP/CPU 19 judges whether or not the AF processing serving as a feature of the present invention has failed (Step S116). If judged that the AF processing serving as a feature of the present invention has not failed in Step S115, the DSP/CPU 19 judges whether or not the AF processing serving as a feature of the present invention has been completed (Step S117). If judged that the AF processing has not been completed, the process returns to Step S116.

If the AF processing serving as a feature of the present invention has been completed without judging that the AF processing has failed (N in Step S116; Y in Step S117), the process advances to Step S118 and the DSP/CPU 19 performs still-image processing under the imaging conditions locked in Step S6. Then, the acquired image data is stored in the DRAM 13 and a JPEG format image file is created from the stored image data and recorded on the memory card 25.

Figure 5:
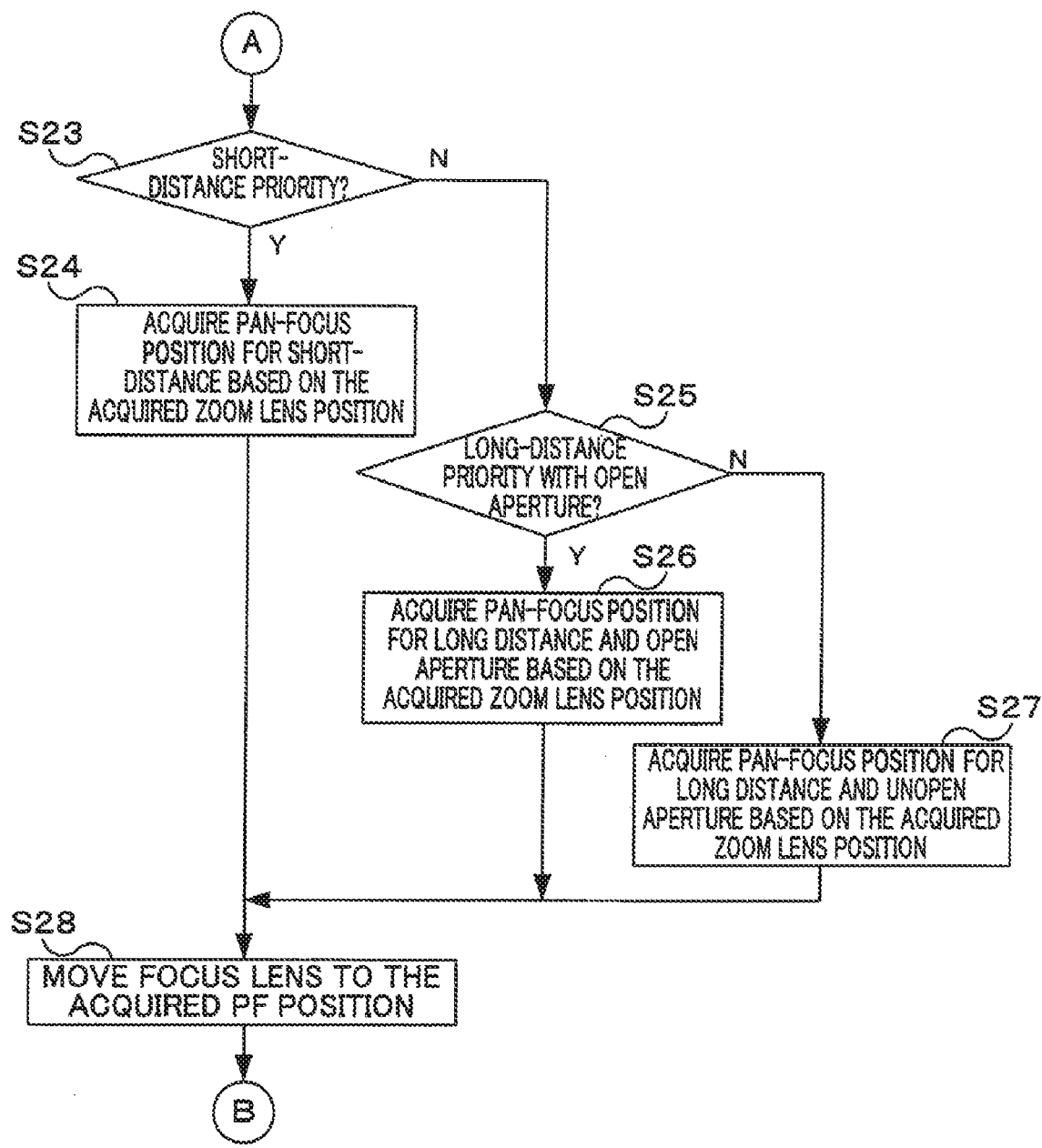
FIG. 5 is a flowchart showing an operation of the digital camera according to the first embodiment.

On the other hand, if judged that the AF processing serving as a feature of the present invention has failed before judging that the AF processing has been completed (N in Step S116), the process advances to Step 23 in FIG. 5 in order to perform the AF processing by pan-focusing.

In addition, when judged that the conventional AF processing has failed in Step S109, in order to perform AF processing by pan-focusing, the DSP/CPU 19 first performs the priority focus determination processing based on the photographic scene (Step S119), acquires the current zoom lens 2b lens position (Step S120), advances to Step S23 in FIG. 5, and performs the AF processing by pan-focusing.

The AF processing by pan-focusing is the same as that in the first embodiment and therefore the explanation is omitted.

B-2. Effect

As described above in the second embodiment, the conventional contrast AF processing is performed when the shutter button has been halfway depressed. If the shutter button is fully depressed before judging that the conventional contrast detection method has been completed, it is judges that a fast imaging is required. The lens positions of the focus lens 2a detected by the contrast AF processing are limited to the acquired three points of focus positions and the focus lens 2a is moved to the focus position among these where the AF evaluated value is the highest. Thus, the object can be focused quickly.

C. Modified Examples

In addition, the following modified examples are possible for the above-mentioned first and second embodiments.

(1) The AF processing serving as a feature of the present invention is executed when the shutter button is fully depressed before a predetermined time duration has passed since the halfway depression of the shutter button (includes when the shutter button has been fully depressed at once) in the first embodiment or when the shutter button is fully depressed before the conventional contrast AF processing commenced by the halfway depression of the shutter button has been completed. However, the focus positions which become the scan representation positions can be acquired when the shutter button is halfway depressed or when the shutter button is fully depressed at once when a predetermined photography mode has been selected and the contrast AF processing can be performed at the acquired focus positions.

In other words, the AF processing under the predetermined photography mode determines the priority focus type, acquires the lens position and, based on these, performs the contrast AF processing at the focus positions which become scan head positions. Furthermore, although the conventional contrast AF processing is conventionally performed in response to the halfway-depression or full-depression manipulation of the shutter button, the AF processing serving as a feature of the present invention can be performed in response to the halfway-depression or full-depression manipulation of the shutter button.

(2) The AF processing serving as a feature of the present invention is only performed when provided with an AF function by the phase difference detection method and the AF processing by the phase difference detection method has failed (when unfocused).

(3) Also, although the zoom lens 2b lens position is acquired and the priority focus type is determined after the shutter button has been fully depressed, the zoom lens 2b lens position can be acquired and the priority focus type can be determined endlessly in continuance while the through-image is displayed. Also, the focus position which becomes the scan representation position is acquired based on the priority focus and the lens position of the zoom lens 2b judged based on the through-image immediately before the shutter button is halfway depressed (or fully depressed) when the shutter button has been fully depressed at once, when the shutter button has been fully depressed without the passage of a predetermined time duration after the shutter button was halfway depressed, or when the shutter button has been fully depressed before the conventional contrast AF processing commenced by the halfway depression of the shutter button was completed. Therefore, an object can be focused even faster.

(4) Also, although a plurality of focus positions are recorded in the scan representation position table respectively as the scan representation positions corresponding to the lens position of the zoom lens 2b and the judged priority focus, one focus position can be recorded respectively as well. In other words, as shown in the pan focus position table shown in FIG. 3, one point is determined respectively as the scan representation position corresponding to the lens position of the zoom lens 2b and the judged priority focus. In this case, the focus lens can be driven within a narrow range and the focus lens 2b can be driven to the focus position with the highest AF evaluated value, with the focus position acquired as the scan representation position as reference.

(5) Also, although focus positions which become three search points are recorded in the scan representation position table, a search range table showing the search range can be provided in addition and the contrast AF processing can be performed within this search range. The search range corresponding to the lens position of the zoom lens 2b and the priority focus type is recorded to this search table in advance. As a method for specifying the search range, the search range can be specified by recording the focus positions which will be both ends of the search range.

(6) Also, a sampling interval table showing the sampling interval can be provided in place of the scan representation position table. The sampling interval corresponding to the lens position of the zoom lens 2b and the priority focus type can be recorded to this sampling interval table in advance. In this case, although the search range is the same as the search range in the conventional contrast AF processing, the sampling interval is larger than the sampling interval in the conventional contrast AF processing.

(7) Also, the above-mentioned search range table and sampling interval table can be provided in place of the scan representation position table and the search range and the search interval can be changed in accordance to the current lens position of the zoom lens 2b and the priority focus type.

(8) Also, although the scan representation position table and the pan-focus position table are provided in advance, the focus position which becomes the scan representation position and the focus position of the pan-focusing can be determined by calculation without providing these tables.

(9) Also, although wait processing is executed until judged that the conventional contrast AF processing has been completed when the conventional contrast AF processing commences and the shutter button is judged to have been fully depressed before the completion of the conventional contrast AF processing, if judged incomplete in Step S20 in FIG. 4, it can be judged that fast imaging is required, the conventional contrast AF processing can be aborted, the process can advance to Step S10, and the AF processing serving as a feature of the present invention can be executed. In other words, the second embodiment can be applied to the first embodiment.

(10) Although three points of focus positions corresponding to the priority focus type and the zoom lens position are stored in the scan representation position table, three points of focus positions corresponding only to the priority focus type can be stored as well. In other words, the current photographic scene can be judged and three points of focus positions which become the scan representation positions can be acquired by the priority focus type based on the judged photographic scene.

In addition, similarly, focus positions corresponding only to the priority focus type can be stored in the pan-focus position table.

(11) The digital camera 1 in the above-mentioned preferred embodiments is not restricted to these embodiments. For example, the present invention can be a mobile phone with camera features, a PDA with camera features, a personal computer with camera features, an IC recorder with camera features, a digital video camera, etc. In short, any apparatus which can photograph an object is applicable.

In addition, although the photographic scene is determined by whether or not there is a strobe light, a flicker from a fluorescent light, etc., in the priority focus determination processing based on the photographic scene in the above-mentioned embodiments, the photographic scene can be determined using other information if there is information enabling evaluation of the distance between the camera and the main object, the state of distance distribution of the main object, etc.

A program for an image apparatus in one embodiment of the present invention is stored to a memory (e.g., ROM, etc.) of the image apparatus. However, the program should be also protected when this imaging program is stored to a memory medium and only the program is manufactured, sold, etc. In a protecting mode of this case, the program is protected in the mode of the recording medium storing the program.

While the present invention has been described with reference to the preferred embodiments, it is intended that the invention be not limited by any of the details of the description therein but includes all the embodiments which fall within the scope of the appended claims.

What is claimed is:

1. An imaging apparatus, comprising:
    image pickup means for imaging an object;
    contrast AF means for performing a contrast AF operation including detecting, for each of a plurality of lens positions of a focus lens, an AF evaluation value of an image picked up by the image pickup means at the lens position, and moving the focus lens to a focus lens position based on the plurality of detected AF evaluation values;
    lens position storing means for storing a respective predetermined number of lens position settings in association with at least one of (i) each of a plurality of photographic scene types and (ii) each of a plurality of zoom magnifications;
    deciding means for deciding whether to perform a priority contrast AF operation in which the contrast AF means performs the contrast AF operation such that a number of the lens positions of the focus lens at which the AF evaluation values are detected is limited to the predetermined number;
    judgment means for judging at least one of a photographic scene type and a zoom magnification;
    priority contrast AF control means for, when the deciding means decides to perform the priority contrast AF operation, acquiring from the lens position setting storage means the lens position settings corresponding to the at least one of the photographic scene and the zoom magnification judged by the judgment means, and controlling the contrast AF means to perform the priority contrast AF operation such that the AF evaluation values are only detected at lens positions corresponding to the acquired lens positions settings;
    normal contrast AF control means for controlling the contrast AF means to perform a normal contrast AF operation, in which the contrast AF means performs the contrast AF operation without limiting the number of the lens positions of the focus lens at which the AF evaluation values are detected to the predetermined number; and
    a shutter button having a half-depressed position and a fully-depressed position;
    wherein the deciding means decides whether to perform the priority contrast AF operation or the normal contrast AF operation based on operation of the shutter button; and
    wherein the deciding means decides to perform the priority contrast AF operation when the shutter button is fully-depressed without the shutter button first being held in the half-depressed position.

2. The imaging apparatus according to claim 1, wherein each predetermined number of lens position settings indicates a plurality of lens positions separated by a constant interval.

3. The imaging apparatus according to claim 1, wherein each predetermined number of lens position settings indicates a plurality of lens positions that are in a range that is smaller than a drivable range of the focus lens.

4. The imaging apparatus according to claim 3, wherein the respective predetermined numbers of lens position settings stored in association with at least one of (i) each of a plurality of photographic scene types and (ii) each of a plurality of zoom magnifications settings indicate pluralities of lens positions that are in ranges having different magnitudes.

5. The imaging apparatus according to claim 1, further comprising:
    failure judgment means for judging whether or not the priority contrast AF operation controlled by the priority contrast AF control means has failed; and
    pan-focus AF control means for performing focusing on the object by pan-focus when the failure judgment means judges that the priority contrast AF operation controlled by the priority contrast AF control means has failed.

6. The imaging apparatus according to claim 5, wherein the lens position storing means stores one respective pan-focus lens position setting in association with at least one of (i) each of the plurality of photographic scene types and (ii) each of the plurality of zoom magnifications; and
    wherein the pan-focus AF control means acquires from the lens position setting storage means the one pan-focus lens position setting corresponding to the at least one of the photographic scene and the zoom magnification judged by the judgment means, and performs focusing on the object by driving the focus lens to a lens position indicated by the acquired lens position setting.

7. The imaging apparatus according to claim 1, further comprising:
    phase difference AF means for focusing on the object by detecting a phase difference of an image formed in a ranging sensor array; and
    failure judgment means for judging whether or not the focusing by the phase difference AF means has failed;
    wherein the deciding means decides to perform the priority contrast AF operation when the failure judgment means judges that the focusing by the phase difference AF means has failed.

8. The imaging apparatus according to claim 1, wherein the plurality of photographic scene types include a photographic scene type in which priority is given to a short-distance view, and a photographic scene type in which priority is given to a long-distance view.

9. The imaging apparatus according to claim 1, wherein the lens position storing means stores a respective predetermined number of lens positions settings for each combination of one of the plurality of photographic scene types with one of the plurality of zoom magnifications;
wherein the judgment means judges both the photographic scene type and the zoom magnification; and
wherein the priority contrast AF control means acquires from the lens position setting storage means the lens position settings corresponding to both the photographic scene and the zoom magnification judged by the judgment means.

10. The imaging apparatus according to claim 1, wherein the predetermined number is three.

11. The imaging apparatus according to claim 1, wherein the predetermined number is one.

12. An imaging apparatus comprising:
image pickup means for imaging an object;
contrast AF means for performing a contrast AF operation including detecting, for each of a plurality of lens positions of a focus lens, an AF evaluation value of an image picked up by the image pickup means at the lens position, and moving the focus lens to a focus lens position based on the plurality of detected AF evaluation values;
lens position storing means for storing a respective predetermined number of lens position settings in association with at least one of (i) each of a plurality of photographic scene types and (ii) each of a plurality of zoom magnifications;
deciding means for deciding whether to perform a priority contrast AF operation in which the contrast AF means performs the contrast AF operation such that a number of the lens positions of the focus lens at which the AF evaluation values are detected is limited to the predetermined number;
judgment means for judging at least one of a photographic scene type and a zoom magnification;
priority contrast AF control means for, when the deciding means decides to perform the priority contrast AF operation, acquiring from the lens position setting storage means the lens position settings corresponding to the at least one of the photographic scene and the zoom magnification judged by the judgment means, and controlling the contrast AF means to perform the priority contrast AF operation such that the AF evaluation values are only detected at lens positions corresponding to the acquired lens positions settings;
normal contrast AF control means for controlling the contrast AF means to perform a normal contrast AF operation, in which the contrast AF means performs the contrast AF operation without limiting the number of the lens positions of the focus lens at which the AF evaluation values are detected to the predetermined number; and
a shutter button having a half-depressed position and a fully-depressed position;
wherein the deciding means decides whether to perform the priority contrast AF operation or the normal contrast AF operation based on operation of the shutter button;
wherein the deciding means decides to perform the priority contrast AF operation when the shutter button is fully-depressed before a predetermined time has elapsed after the shutter button is half-depressed; and
wherein the deciding means decides to perform the normal contrast AF operation when the predetermined time elapses after the shutter button is half-depressed without the shutter button being fully-depressed.

13. An imaging apparatus comprising:
image pickup means for imaging an object;
contrast AF means for performing a contrast AF operation including detecting, for each of a plurality of lens positions of a focus lens, an AF evaluation value of an image picked up by the image pickup means at the lens position, and moving the focus lens to a focus lens position based on the plurality of detected AF evaluation values;
lens position storing means for storing a respective predetermined number of lens position settings in association with at least one of (i) each of a plurality of photographic scene types and (ii) each of a plurality of zoom magnifications;
deciding means for deciding whether to perform a priority contrast AF operation in which the contrast AF means performs the contrast AF operation such that a number of the lens positions of the focus lens at which the AF evaluation values are detected is limited to the predetermined number;
judgment means for judging at least one of a photographic scene type and a zoom magnification;
priority contrast AF control means for, when the deciding means decides to perform the priority contrast AF operation, acquiring from the lens position setting storage means the lens position settings corresponding to the at least one of the photographic scene and the zoom magnification judged by the judgment means, and controlling the contrast AF means to perform the priority contrast AF operation such that the AF evaluation values are only detected at lens positions corresponding to the acquired lens positions settings;
normal contrast AF control means for controlling the contrast AF means to perform a normal contrast AF operation, in which the contrast AF means performs the contrast AF operation without limiting the number of the lens positions of the focus lens at which the AF evaluation values are detected to the predetermined number; and
a shutter button having a half-depressed position and a fully-depressed position;
wherein the deciding means decides whether to perform the priority contrast AF operation or the normal contrast AF operation based on operation of the shutter button;
wherein the normal contrast AF control means controls the contrast AF means to begin the normal contrast AF operation when the shutter button is half-depressed;
wherein the imaging apparatus further comprises completion judgment means for judging whether or not the normal contrast AF operation has been completed when the shutter button is fully-depressed; and
wherein the deciding means decides to perform the priority contrast AF operation when the completion judgment means judges that the normal contrast AF operation has not been completed when the shutter button is fully-depressed.

14. A computer-readable storage medium having a program stored thereon that is executable by a computer of an imaging apparatus, wherein the imaging apparatus comprises a shutter button having a half-depressed position and a fully-depressed position, and a memory storing a respective predetermined number of lens position settings in association with at least one of (i) each of a plurality of photographic scene types and (ii) each of a plurality of zoom magnifications, the program being executable by the computer to cause the computer to control the imaging apparatus to perform functions comprising:
an image pickup function for imaging an object;
a contrast AF function for performing a contrast AF operation including detecting, for each of a plurality of lens positions of a focus lens, an AF evaluation value of an image picked up by the image pickup function at the lens position, and moving the focus lens to a focus lens position based on the plurality of detected AF evaluation values;

a deciding function for deciding whether to perform a priority contrast AF operation in which the contrast AF function performs the contrast AF operation such that a number of the lens positions of the focus lens at which the AF evaluation values are detected is limited to the predetermined number;

a judgment function for judging at least one of a photographic scene type and a zoom magnification;

a priority contrast AF control function for, when the deciding function decides to perform the priority contrast AF operation, acquiring from the memory the lens position settings corresponding to the at least one of the photographic scene and the zoom magnification judged by the judgment function, and controlling the contrast AF function to perform the priority contrast AF operation such that the AF evaluation values are only detected at lens positions corresponding to the acquired lens positions settings; and a normal contrast AF control function for controlling the contrast AF function to perform a normal contrast AF operation, in which the contrast AF function performs the contrast AF operation without limiting the number of the lens positions of the focus lens at which the AF evaluation values are detected to the predetermined number;

wherein the deciding function decides whether to perform the priority contrast AF operation or the normal contrast AF operation based on operation of the shutter button; and wherein the deciding function decides to perform the priority contrast AF operation when the shutter button is fully-depressed without the shutter button first being held in the half-depressed position.

\* \* \* \* \*